(12) United States Patent
Bridges et al.

(10) Patent No.: US 7,984,005 B2
(45) Date of Patent: **\*Jul. 19, 2011**

(54) ENHANCED ARTIFICIAL INTELLIGENCE LANGUAGE

(75) Inventors: Matthew Bridges, Newton, MA (US); Raymond C. Kurzweil, Newton, MA (US)

(73) Assignee: Kurzweil Technologies, Inc., Wellesley Hills, MA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 12/768,132

(22) Filed: Apr. 27, 2010

(65) Prior Publication Data

US 2010/0205140 A1    Aug. 12, 2010

(51) Int. Cl.
*G06N 5/00* (2006.01)

(52) U.S. Cl. ............... 706/45; 706/47; 706/52; 706/62; 704/231; 704/243; 704/251; 704/270

(58) Field of Classification Search .................. None
See application file for complete search history.

(56) References Cited

U.S. PATENT DOCUMENTS

| | | | |
|---|---|---|---|
| 4,783,752 A | 11/1988 | Kaplan et al. | |
| 4,914,590 A | 4/1990 | Loatman et al. | |
| 5,806,060 A | 9/1998 | Borgida et al. | |
| 5,960,384 A | 9/1999 | Brash | |
| 6,247,007 B1 | 6/2001 | Cooperman et al. | |
| 6,363,301 B1 * | 3/2002 | Tackett et al. | 700/246 |
| 6,532,401 B2 * | 3/2003 | Tackett et al. | 700/245 |
| 6,604,090 B1 * | 8/2003 | Tackett et al. | 706/11 |
| 6,615,111 B2 * | 9/2003 | Tackett et al. | 700/246 |
| 6,629,087 B1 * | 9/2003 | Benson et al. | 706/11 |
| 6,684,188 B1 | 1/2004 | Mitchell et al. | |
| 6,721,706 B1 | 4/2004 | Strubbe et al. | |
| 6,731,307 B1 | 5/2004 | Strubbe et al. | |
| 6,751,606 B1 | 6/2004 | Fries et al. | |
| 6,754,647 B1 * | 6/2004 | Tackett et al. | 706/52 |
| 6,795,808 B1 | 9/2004 | Strubbe et al. | |
| 6,820,070 B2 | 11/2004 | Goldman et al. | |
| 6,877,989 B2 * | 4/2005 | Embretson | 434/236 |
| 7,117,190 B2 * | 10/2006 | Sabe et al. | 706/45 |
| 7,337,157 B2 * | 2/2008 | Bridges et al. | 706/45 |
| 2002/0059045 A1 * | 5/2002 | Tackett et al. | 702/182 |
| 2003/0055623 A1 | 3/2003 | Epstein et al. | |
| 2003/0182391 A1 * | 9/2003 | Leber et al. | 709/217 |
| 2003/0191627 A1 | 10/2003 | Au | |

OTHER PUBLICATIONS

Ringate et al., "AIML Primer", 2001, pp. 1-7.*
Nielsen, "Traditional Dialogue Design Applied to Modern User Interfaces", Communications of the ACM, 1990, pp. 109-118.*
Hanau et al., "Prototyping and Simulation Tools for User/Computer Dialogue Design", ACM, 1980, pp. 271-278.*
"AIML Primer", http://alicebot.org/documentation/aiml-primer.html, pp. 1-7. (Aug. 2001).
http://alicebot.org/documentation/aiml-reference.html, pp. 1-32 (Sep. 2001).
Ringate Thomas, "AIML Primer", http://alicebot.org/documentation/aiml-primer.html, p. 1-7 (Aug. 2001).
Ringate Thomas, "AIML Reference Manual ", http://alicebot.org/documentation/aiml-reference.html, pp. 1-32 (2001).
Ringate Thomas, "AIML Overview", http://alicebot.org/documentation/tutorial.html, pp. 1-7. (Oct. 2002).
Ringate Thomas, "AIML Primer", http://alicebot.org/documentation/aiml-primer.html, pp. 1-7 (Aug. 2001).

* cited by examiner

*Primary Examiner* — Omar F Fernandez Rivas
(74) *Attorney, Agent, or Firm* — Fish & Richardson P.C.

(57) ABSTRACT

A method of implicitly forming a context in a dialogue with a computer includes forming megacategories linking one or more attributes to one of a plurality of response templates. The method also includes determining a megacategory by comparing attributes having true variables from a previous input to attributes having true variables in the present input and selecting an appropriate response template corresponding to the megacategory.

15 Claims, 4 Drawing Sheets

ENHANCED ARTIFICIAL INTELLIGENCE LANGUAGE

TECHNICAL FIELD

This invention relates to artificial intelligence and more particularly to machines that can use artificial intelligence to converse with humans.

BACKGROUND

Since the development of the computer; human beings have sought to construct computers that can think like humans to the degree that these machines have an "artificial intelligence." One of the goals is to develop a computer that could think, learn and carry-on intelligent conversations with humans beings.

Some development of artificially intelligent computers focuses on developing computers that can converse. Thus, a key area in developing an artificially intelligent computer is developing a language that allows a computer to process inputs received from humans and to respond with an appropriate and cogent output. One such language is an Artificial Intelligence Mark-up Language (AIML) developed by Dr. Richard S. Wallace.

AIML is interpreted and processed by an engine called A.L.I.C.E. (Artificial Linguistic Internet Computer Entity). The A.L.I.C.E. engine is designed to receive an input from the user and determine the correct response using knowledge encoded in AIML and stored in a AIML knowledge base. For example, when the input is, "What is two plus two?," the A.L.I.C.E. engine provides the response, "4." In arriving at the response of "4," the A.L.I.C.E. engine searches a list of categories within the AIML knowledge base. Each category contains a pattern that is linked to a single response template. The A.L.I.C.E. engine matches the user input against the available patterns in the AIML knowledge base. After finding a match in a pattern, the pattern's corresponding response template is activated and a series of actions are carried out by the A.L.I.C.E. engine.

SUMMARY

In one aspect the invention is a method of implicitly forming a context in a dialogue with a computer. The method includes forming megacategories linking one or more attributes to one of a plurality of response templates. The method also includes determining a megacategory by comparing attributes having true variables from a previous input to attributes having true variables in the present input, and selecting an appropriate response template corresponding to the megacategory.

In another aspect, the invention is an article that includes a machine-readable medium that stores executable instructions for forming a context in a dialogue with a computer. The instructions cause a machine to form megacategories linking one or more attributes to one of a plurality of response templates. The instructions also cause a machine to determine a megacategory by comparing attributes having true variables from a previous input to attributes having true variables in the present input, and select an appropriate response template corresponding to the megacategory.

In a still further aspect, the invention is an apparatus that includes a memory that stores executable instructions forming a context in a dialogue with a computer. The apparatus also includes a processor that executes the instructions to form megacategories linking one or more attributes to one of a plurality of response templates. The processor also executes instructions to determine a megacategory by comparing attributes having true variables from a previous input to attributes having true variables in the present input, and to select an appropriate response template corresponding to the megacategory.

One or more aspects above may have one or more of the following features. Each aspect may include determining which attributes have patterns that match portions of a user's present input to the dialogue with each attribute having a variable used to record whether a match exists. Each aspect may also include marking a variable of attributes true for those attributes having matched patterns. Each attribute may be associated with a set of patterns and each pattern within the set of patterns may be semantically equivalent. Each aspect may also include storing a list of matched attributes for each user input.

One or more of the aspects above have one or more of the following advantages. Enhanced artificial intelligence language engine can accept knowledge base data from existing languages such as AIML code. The enhanced artificial intelligence language allows for the implicit recognition of contextual information. The enhanced artificial intelligence language extends the pattern matching capabilities of AIML, and allows knowledge base developers to reuse portions of a knowledge base for generating other knowledge bases. Since the enhanced artificial intelligence language is a modular language, portions of the knowledge base can be modified without modifying the entire knowledge base.

DESCRIPTION

Figure 1:
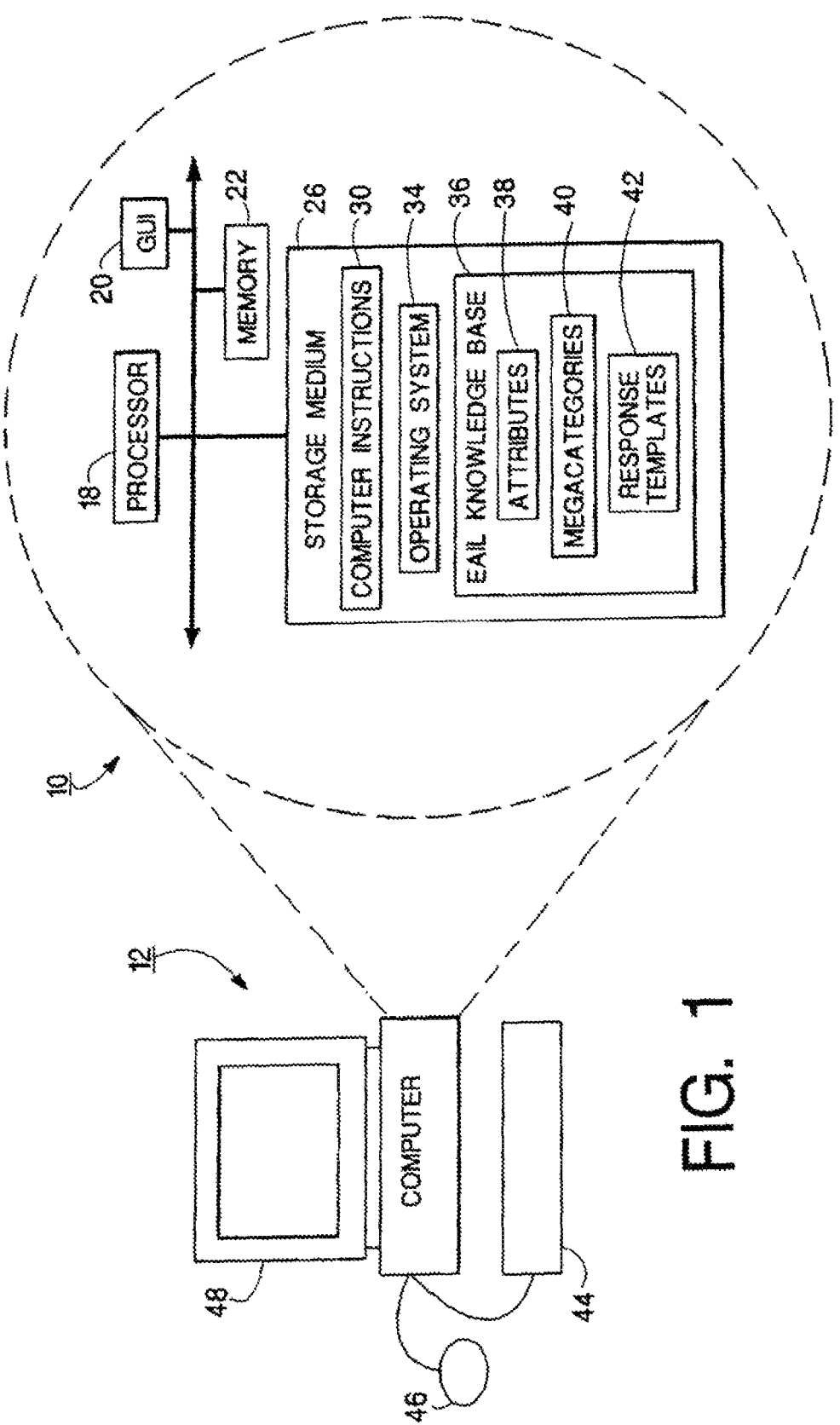
FIG. 1 is a system for processing an enhanced artificial intelligence language.
Figure 3:
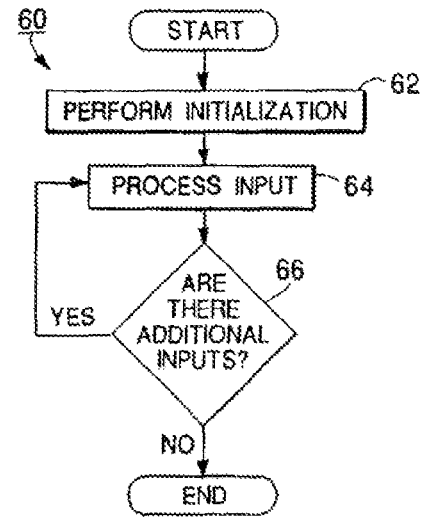
FIG. 3 is a process for generating a response.

Referring to FIG. 1, an enhanced artificial intelligence language (EAIL) engine 10, within a system 12 (e.g., a computer), is used to process user inputs and to generate appropriate responses using a process 60 (FIG. 3). EAIL engine 10 includes a processor 18, a graphical user interface (GUI) 20, a memory 22, and a storage medium 26 (e.g., a hard disk). Storage medium 26 stores a set of computer instructions 30, an operating system 34 and an EAIL knowledge base 36. EAIL knowledge base 36 includes attributes 38, megacategories 40 and response templates 42. Each of the components within knowledge base 36 is further discussed below. A knowledge base forms a unique artificial personality.

EAIL engine 10 receives a user's inputs. The user inputs a question or statement using an input/output (I/O) interface, such as a keyboard 44 and/or a mouse 46, using a GUI 20. GUI 20 renders a computer image of a cyber personality on display 48 to give a user a semblance of an intelligent entity. For example, the cyber personality could be a human 3-dimensional face. The set of computer instructions 30 is executed by processor 18 out of memory 22 to process the inputs using knowledge base 36 to determine the matching megacategory in order to generate an appropriate response.

Figure 2:
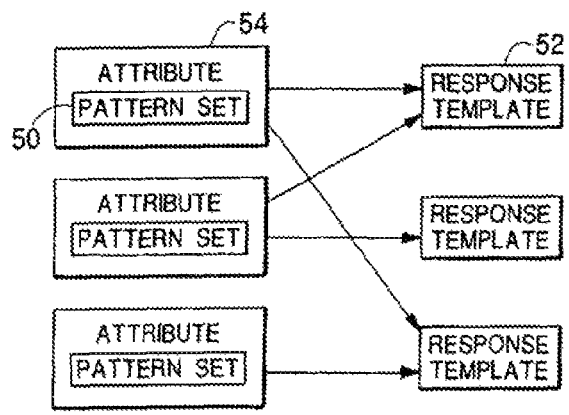
FIG. 2 is a diagram of the relationship between attributes and response templates in the enhanced artificial intelligence language (EAIL).

Referring to FIG. 2, in EAIL engine 10, a pattern is not necessarily tied to a single response template 52. Instead, EAIL engine 10 includes attributes 54. An attribute 54 has a set of patterns 50 that are semantically (though not syntactically) equivalent within an attribute 54. Each attribute is the association of a pattern of letters with their meaning. For example, a "hello" attribute contains a sequence of letters that have been defined to mean hello (e.g., hi, howdy, bonjour, etc.).

In EAIL engine 10, categories link attributes 54 to response templates 52 using Boolean expressions. In these expressions, the atomic propositions are attributes 38. Categories that use combinations of attributes, instead of a single pattern, are called megacategories 40.

Since multiple attributes can be used in combination, the structure of EAIL knowledge base 36 includes attributes, and response templates and a set of rules for mapping attributes to response templates. By decoupling patterns from responses, and grouping them into semantically equivalent attributes, it is easier to re-use patterns for knowledge bases with different artificial personalities.

EAIL 10 searches attributes to match the input to the appropriate attribute. Even when no megacategories match (i.e., no Boolean expression evaluated is true), EAIL engine 10 looks at the attributes that matched the previous input. These attributes can be used in conjunction with the attributes that matched the current input. Thus, EAIL engine 10 can determine context without the knowledge base coder having to explicitly set variables beforehand.

EAIL engine 10 has a modular approach, where a set of attributes can be generated and distributed without having any affect on any one artificial personality. Since pattern matching in EAIL engine 10 is done independently of megacategories, multiple wildcards and more general regular expression operators can be added while still employing most of AIML's category selection algorithm.

I. EAIL Knowledge Base Overview

A. EAIL Knowledge Base Syntax

EAIL uses an XML-based format to encode knowledge. EAIL files have an ".eail" extension and have a root element named <eail>. A partial document type definition (DTD) for EAIL appears below. The definition of the contents of the <template> tag and the <category> tag, not shown, are identical to their AIML 1.0 analogs except for the <star> tag.

```
<!ELEMENT eail (attribute*, category*, megacategory*,
   topic*)>
   <!ELEMENT attribute (pattern+)>
   <!ELEMENT megacategory (that, expr, template)>
   <!ELEMENT topic (category*, megacategory*)>
   <!ELEMENT pattern (#PCDATA)>
   <!ELEMENT that (#PCDATA)>
   <!ELEMENT expr (#PCDATA)>
   <!ATTLIST attribute
      name CDATA #REQUIRED>
   <!ATTLIST megacategory
      level CDATA #IMPLIED>
   <!ATTLIST pattern
      sindex CDATA #IMPLIED>
```

B. Attributes

Each attribute 38 in EAIL knowledge base 36 has a name and a set of one or more patterns 40. The name of an attribute may be any combination of letters, numbers and an underscore. One or more of the following symbols may appear in a pattern. An "*" symbol, (asterisk), denotes a wildcard and matches one or more words in the input. An "_" symbol, (underscore), is also a wildcard, and provides the same function as the asterisk except the underscore lexicographically precedes all alphanumeric characters, whereas the asterisk follows alphanumeric characters. A "?" symbol, (question mark), immediately after a word makes the word optional. A "{ ... | ... }" symbol represents series of words that appear between "{" and "}" and are separated by "|" to denote a selection of one of the words in the series. A "%" symbol, a percent symbol, can appear immediately before or after a word to show that the word can be a sub-string of a word in the input. For example, "% comfort %" would match "comfort," "comfortable", and "uncomfortable".

Each pattern may also have a "sindex" attribute. The "sindex" attribute is used to determine which asterisk to use when the <star> tag appears in a response template. Since there are multiple wildcards in a pattern, ambiguity can arise unless it is clear which wildcard is meant to be used. In the absence of this attribute, the value 1 is assumed (1 is the first wildcard, not 0).

C. Megacategories

Each megacategory 40 links a combination of attributes 38 to a single response template 42. The combination is represented by an expression having attributes' names, the AND operator (&&), and the OR operator (||). Parentheses are allowed, but the unary NOT (!) is not allowed. These expressions will be converted to disjunctive normal form by EAIL engine 10 for efficient evaluation.

Each megacategory may optionally have a "that" tag, which is semantically equivalent to the "that" tag in AIML categories. The "that" tag contains a pattern that matches against a previous artificial personality output that allows a programmer to put in different responses to the same input based on what the artificial personality just said. For example, a programmer wants to program a knock-knock joke. The artificial personality will start by saying "knock, knock." Then the user will say "Who's there?" When programming a response to the pattern "Who's there?," the programmer would put a "that" tag in with the pattern "knock, knock." If the programmer leaves out the "that" tag, the artificial personality will try to tell knock-knock jokes any time the user says "Who's there?," which is not the desired behavior. For instance, if the artificial personality says "I'm going to visit someone in Florida," and the user says "Who's there?," it would be inappropriate for the artificial personality to tell a knock-knock joke.

A programmer designing knowledge base 36 may also optionally assign a level to each megacategory. Giving megacategories different levels imposes an explicit hierarchy on the order in which megacategories are evaluated by EAIL engine 10. As a default, all megacategories are set at level one. All megacategories of level one are considered before megacategories of level 2, and all megacategories of level 2 are considered before megacategories of level 3, etc.

The response template for a megacategory is identical to the response template for an AIML category, except in the treatment of the <star> tag. Since there are possibly multiple attributes working together in a megacategory, the <star> tag references the name of the attribute that contains the wildcard it is referencing. Within the attribute, the pattern tag contains information about which specific asterisk to use (i.e., "sindex" attribute). When multiple patterns within an attribute match the input, and they all have a "sindex" attribute, the pattern with the highest specificity rank has precedent.

D. Categories

Categories have the same knowledge that was originally intended for use by an AIML engine. In order to be used in an EAIL knowledge base, each category is converted to an equivalent combination of an attribute and a megacategory. This conversion is carried out by EAL engine 10, and is transparent to the knowledge base code developer.

E. Topics

Megacategories and categories can be grouped into topics, which are identical to topics in AIML. A topic is identified by its name. A special "topic" variable may be set in a response template. Megacategories and categories that appear within a <topic> tag will only match when the topic variable matches the name of the topic.

II. EAIL Engine Processes

A. Category Conversion

Figures 4, 7:
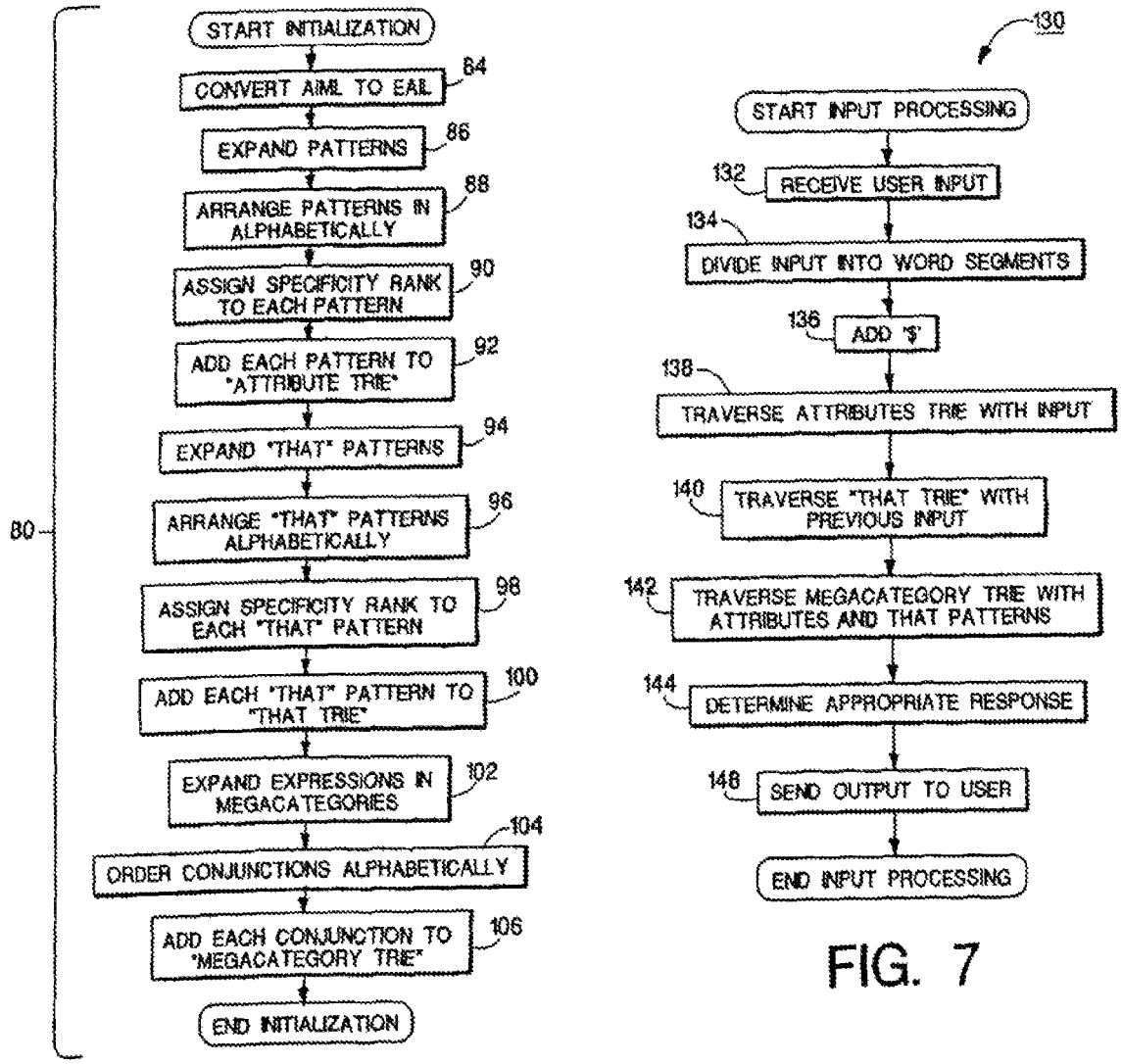
FIG. 4 is an initialization process.
FIG. 7 is a process for processing an input.

Referring to FIGS. 3 and 4, process 60 performs (62) an initialization using a process 80. Process 80 converts (84) all of the AIML categories in EAIL knowledge base 36 that were intended for the A.L.I.C.E. AIML interpreter, to EAIL megacategories 40, before any patterns are matched or any response is generated. Each category includes a pattern and a response template. A new attribute, with an automatically generated name, is generated with the one pattern. A new megacategory is also generated having the same response template as the original category (with <star> expressions converted to be compatible with EAIL). The expression is the name of the newly generated attribute. For example, given:

```
<category>
    <that>WHAT CAN I HELP YOU WITH</that>
    <pattern>PLEASE *</pattern>
    <template><srai><star/></srai></template>
</category>
``` is converted into:

```
<attribute name="abcd">
    <pattern sindex="1">PLEASE *</pattern>
</attribute>
<megacategory>
    <that>WHAT CAN I HELP YOU WITH</that>
    <expr>abcd</expr>
    <template><srai><star attribute="abcd"/></srai></template>
</megacategory>
``` where "abcd" is an automatically generated name for the attribute.

Matching the patterns to the appropriate response is data in which there is one node for every common prefix. The strings are stored in extra leaf nodes.

An attribute trie structure is generated during EAIL engine initialization. The trie has all of the patterns from within all the attributes in EAIL knowledge base 36. Before the patterns are inserted into the attribute trie, process 80 expands (86) the patterns into patterns that do not contain any '{ ... | ... }' or '?' symbols. These symbols are removed by generating a set of patterns that as a whole perform the same function before removing any symbols. For instance, the pattern "A B? C" is expanded into two patterns: "A C" and "A B C". In another instance, the pattern "A {B|C}" is expanded to "A B" and "A C". In addition to the expansion, a special '$' symbol is appended to each pattern, to represent the end of the input.

Process 80 arranges (88) all of the patterns in the knowledge base 36 in alphabetical order. Process 80 assigns (90) a specificity rank that represents its position within the alphabetical list. The specificity rank is used to determine a pattern's "specificity" in relation to other patterns when choosing between multiple matching megacategories as described below (see FIG. 8). Process 80 adds (92) each pattern to a trie to form an attribute trie.

The following is one example to generate an attribute trie:

```
for each pattern in set
    current_node := root
    for each word w in pattern
        if (branch exists from current_node on w)
            current_node := node attached to branch
            continue
        else
            generate new_node
            generate a branch from current_node to
                new_node on w
            current_node := new_node
        end if
    end for
    set current_node to be a "match" node
end for
```

Figure 5:
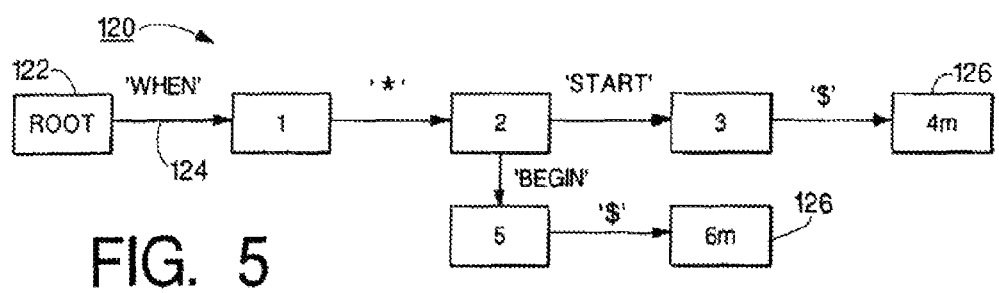
FIG. 5 is an example of an attribute trie used in determining matching patterns.

FIG. 5 shows a finished attribute trie 120 for the patterns "WHEN * START $" and "WHEN * BEGIN $". Each box above represents a node 122, and each arrow represents a branch 124. Nodes with a 'm' in their name (nodes 4 and 6) are match nodes 126. As will be described further below, reaching these matched nodes, during a traversal of the attribute trie, indicates that a pattern has been matched.

During initialization a "that" trie is generated similarly to the attribute trie. Process 80 expands (94) the "that" patterns. Process 80 arranges (96) the "that" patterns alphabetically. Process 80 assigns (98) a specificity rank to each "that" pattern. Process 80 adds (100) each pattern to a trie to form a "that" trie.

During initialization a megacategory trie is also generated. Process 80 expands (102) expressions in the megacategories into the disjunctive normal form. Process 80 orders (104) the conjunctions alphabetically. Process 80 adds (106) each conjunction to a trie to form a "megacategory" trie. A separate trie for each "level" of megacategories in the EAIL knowledge base is generated.

For example of generating a megacategory trie, consider a megacategory that has the expression "C && (A||B)", a "that" tag, and a topic. A variable is generated by EAIL engine 10 for both the "that" tag and the topic. Suppose the variable for the "that" tag is "D" and the variable for the topic is "E". EAIL engine 10 "AND's" the original expression with both variables. The expression becomes "((C && (A||B)) && D) && E".

Figure 6:
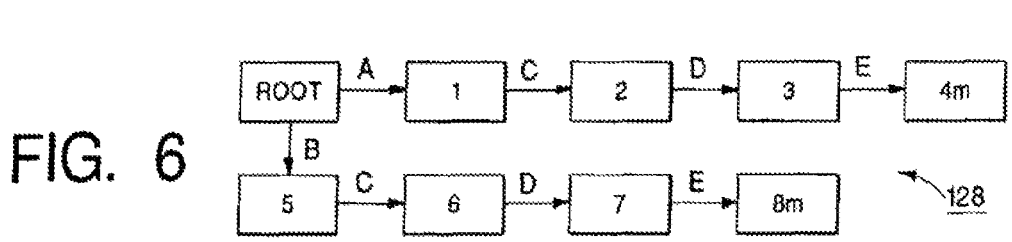
FIG. 6 is an example of a megacategory trie used in selecting a response template.

This compound expression is expanded to the DNE. In this example, the resulting expression would be "(C && A && D && E)||(C && B && D && E)". Each conjunction is ordered alphabetically by variable name, so each conjunction now becomes "(A && C && D && E)||(B && C && D && E)". The conjunctions (two in all for this example) are added to a trie (not shown) constructed similarly to trie 128 in FIG. 6. Each matching node maintains a link to the megacategory with which it is associated.

B. Processing an Input

Referring to FIGS. 3 and 7, process 60 processes (54) an input using a process 130 by traversing the tries (e.g., attribute trie, that trie, and megacategory trie) generated during initialization (e.g., process 80). Process 130 receives (132) an input.

To traverse the attribute trie, process 130 divides (134) the input up into words. Punctuation is removed and spaces between words in the input are treated as a word delimiter. Process 110 appends (136) the words with a '$' symbol.

Process 110 traverses (138) the attribute trie with the input to obtain a list of matching attributes. One example of traversing the attribute trie uses the following:

```
procedure findPatterns(input)
        findPatterns(root, input, 0);
end procedure
procedure findPatterns(current_node, input, pos+2)
        if (current_node is match node)
                pattern found
        end if
        cur_word := word at position pos in input
        for each branch from current_node on cur_word
                new_node = node attached at branch
                findPatterns(new_node, input, pos+1)
        end for
        if (branch exists from current node on "*" or "_")
                new_node = node attached at branch
                resolveWildCard(new_node, input, pos)
        end if
end procedure
procedure resolveWildCard(current_node, input, pos)
        for each word w in input starting at position pos
                if (branch exists from current_node on w)
                        new_node = node attached at branch
                        new_pos := position of w in input
                        findPatterns(new_node, input, new_pos)
                end if
        end for
end procedure
```

Process 130 traverses (140) the "that" trie with the previous output of EAIL engine 10 to obtain a list of matching "that" patterns.

Process 130 traverses (142) the megacategory trie with matched attributes and matched "that" patterns (and with topic variables if applicable) to obtain a list of matching megacategories. In traversing trie 128, the following is used to find all matching expressions:

```
procedure findExpressions(vars_list)
    for pos1 := 0 to length of vars_list
        current_node := root
        for pos2 := pos1 to length of vars_list
                var := variable at pos2 in vars_list
                if (current_node is match)
                        matching expression found
                end if
                if (branch exists from current_node on var)
                        current_node := node attached at branch
                else
                        break
                end if
        end for
    end for
end procedure
```

Each generated level of megacategory trie is traversed. The megacategory tries corresponding to level one are traversed first. If no matching megacategories are found, then level 2 megacategory tries are traversed, and so on until there are no more megacategory tries to traverse. When this procedure concludes, a set of megacategories remains that are matched to the current input.

C. Determining an Appropriate Response Template

Figure 8:
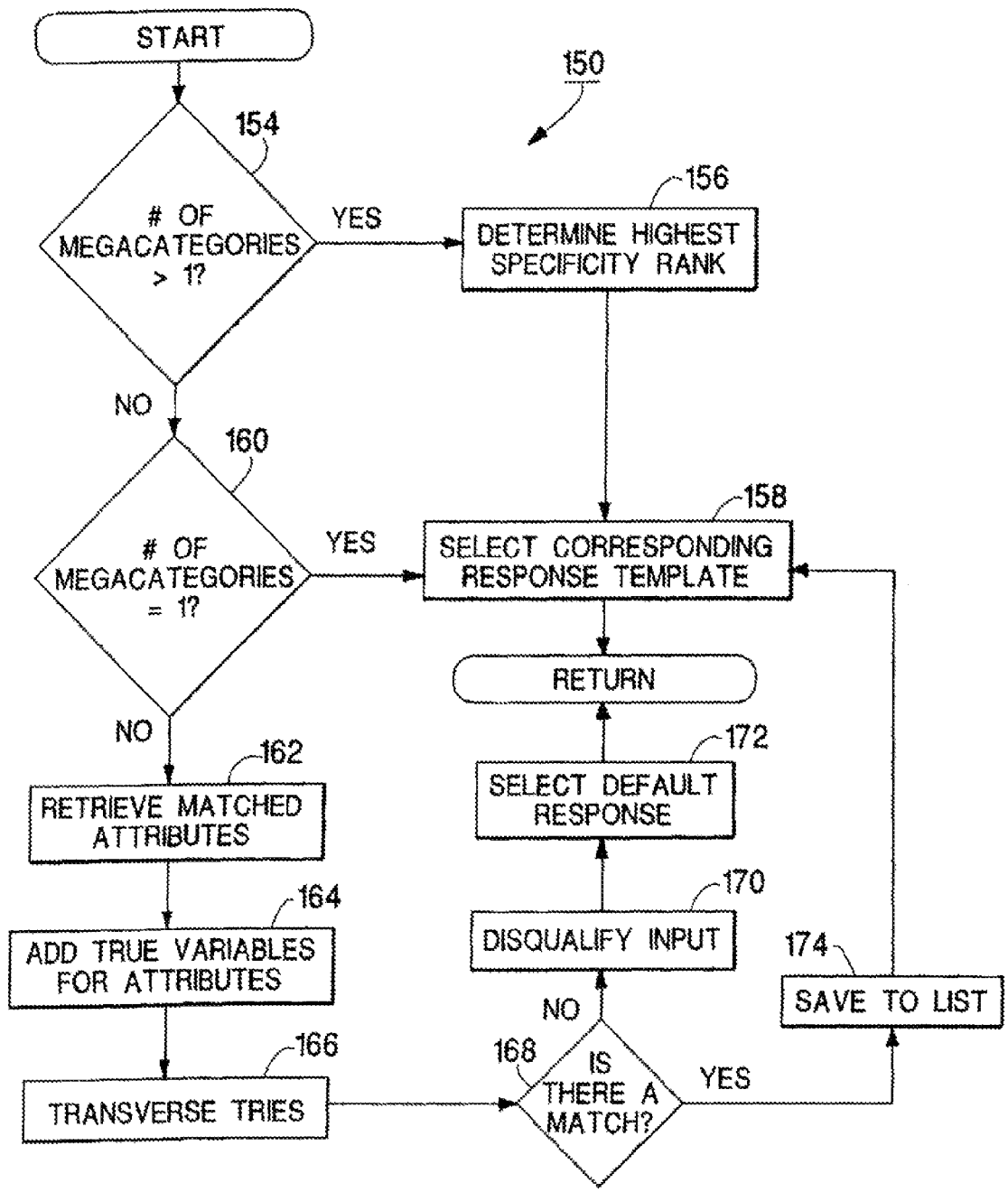
FIG. 8 is a process for selecting a response template.

Referring to FIGS. 7 and 8, process 80 determines (144) ah appropriate response using a process 150. Process 150 determines (154) if more than one megacategory matches. If more than one megacategory matches, process 150 determines (156) the highest "specificity rank" from each of the matching megacategories. The specificity rank is determined for each of the patterns during EAIL engine initialization in process 80 (see FIG. 4). The specificity rank of a megacategory is equal to the sum of the specificity ranks of the patterns that contributed to the matching of the megacategory. In the case of a tie, the megacategory with the highest single ranking for a specific pattern is used. Process 150 selects (158) the corresponding response template.

Process 150 determines (160) if only one megacategory has been matched. If only one megacategory has been matched process 150 selects (158) the corresponding response template to the matched megacategory.

Otherwise, no megacategories are matched. EAIL engine 10 stores a list of matched attributes for each user input. Process 150 retrieves (162) the matched attributes from the previous user input. Process 150 adds (164) the matched attributes from the previous input to a current list of matched attributes. Only matched attributes are propagated forward (i.e., topic variables and "that" tag variables do not propagate forward from previous inputs). After previous matched attributes are added to the current list, process 150 traverses (166) the tries for each level. Thus, EAIL engine 10 is "implicitly" determining context.

For example, consider a knowledge base with the following data:

```
<eail>
    <attribute name="head">
        <pattern>* HEAD *</pattern>
    </attribute>
    <attribute name="pain">
        <pattern>* HURT% *</pattern>
    </attribute>
    <attribute name="duration">
        <pattern>WHEN * {START | BEGIN}</pattern>
        <pattern>HOW LONG *</pattern>
    </attribute>
    <megacategory>
        <expr>head</expr>
        <template>My head hurts.</template>
    </megacategory>
    <megacategory>
        <expr>head && pain && duration</expr>
        <template>My head has been hurting for about a day</template>
    </megacategory>
</eail>
```

If the user types in, "Tell me about your head," only the "head" variable will be set to true. The one megacategory with "head" as its expression will match, and EAIL engine 10 responds "My head hurts." If the user types in, "How long has it been hurting," the "pain" and "duration" variables will artificial both be set to true. However, there are no megacategories that match just those two variables. EAIL engine 10 adds "head," from the last input, to the current list of matched attributes. The megacategory with "head && pain && duration" now matches, and EAIL engine 10 responds "My head has been hurting for about a day." In this way, EAIL engine 10 determined that the user was talking about the head without the knowledge base code developer having to explicitly set a topic or a "that" tag.

Process 150 determines (168) if there are any megacategories that match. If there are still no matching megacategories, process 150 disqualifies (170) the input. This ensures that EAIL engine 10 does not give the same response twice in a row when no matched attributes occur for a given input. Process 150 selects (172) a default response so that when executed responds to the user with a "request for clarification" response.

If a pattern matches on the second traversal, process 150 saves (174) the attributes that match permanently to a list of "current" matched attributes. Thus, if the user asked another question about the "head", as in the example described above, "head" would be a part of the previous list of matched attributes.

Referring back to FIGS. 3 and 4, process 80 sends (144) the appropriate response. Process 60 determines (66) if there are additional inputs. If there are additional inputs, process 60 processes (64) the input.

OTHER PROCESSING EMBODIMENTS

Processes 60, 80, 130 and 150 are not limited to use with the hardware and software of FIG. 1; it may find applicability, in any computing or processing environment and with any type of machine that is capable of running a computer program. Processes 60, 80, 130 and 150 may be implemented in hardware, software, firmware or any combination of the three. For example, processes 60, 80, 130 and 150 may be implemented in a circuit that includes one or a combination of a processor, a memory, programmable logic and logic gates. Processes 60, 80, 130 and 150 may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processes 60, 80, 130 and 150 and to generate output information.

Each such program may be implemented in a high level procedural or object-oriented programming language to communicate with a computer system. However, the programs can be implemented in assembly or machine language. The language may be a compiled or an interpreted language. Each computer program may be stored on a storage medium or device (e.g., CD-ROM, hard disk, or magnetic diskette) that is readable by a general or special purpose programmable computer for configuring and operating the computer when the storage medium or device is read by the computer to perform processes 60, 80, 130 and 150. Processes 60, 80, 130 and 150 may also be implemented as a machine-readable storage medium, configured with a computer program, where upon execution, instructions in the computer program cause the computer to operate in accordance with processes 60, 80, 130 and 150.

The process is not limited to the specific embodiments described herein. For example, GUI 20 does not need to display a three-dimensional person to depict the cyber personality. The dialogue between EAIL 10 and the user can be in the form of text messages on a screen. The process is not limited to the specific processing order of FIGS. 3, 4, 7 and 8. Rather, the blocks of FIGS. 3, 4, 7 and 8 may be re-ordered, as necessary, to achieve the results set forth above.

Other embodiments not described herein are also within the scope of the following claims.

What is claimed is:

1. A method of implicitly forming a context in a dialogue with a computer, comprising:

forming by a computer a plurality of megacategories, with megacategories being combinations of one or more attributes linking to one response template, of a plurality of response templates with each of the plurality of the formed megacategories linked by associated attributes to a corresponding one of the plurality of response templates;

selecting by the computer from the formed megacategories, a suitable megacategory for a present input involved with a dialog with the computer by comparing attributes having true variables from a previous input in the dialog to attributes having true variables in the present input; and selecting by the computer an appropriate response template corresponding to the selected megacategory.

2. The method of claim 1 wherein each attribute is associated with a set of patterns and each pattern within the set of patterns is semantically equivalent.

3. The method of claim 2, further comprising:

determining by the computer which attributes have patterns that match portions of the present input to the dialogue, each attribute having a variable used to record whether a match exists.

4. The method of claim 3, further comprising:

marking a variable of attributes true, for those attributes having matched patterns.

5. The method of claim 3, further comprising:

storing a list of matched attributes for each user input.

6. A computer program product tangible embodied on a machine-readable storage device the computer program product comprising executable instructions for forming a context in a dialogue with a computer, the instructions causing a machine to:

form megacategories, with megacategories being combinations of one or more attributes linking to one response template, of a plurality of response templates with each of the plurality of the formed megacategories linked by associated attributes to a corresponding one of the plurality of response templates;

select from the formed megacategories a suitable megacategory for a present input involved with a dialog with the machine by comparing attributes having true variables from a previous input to attributes having true variables in the present input; and select an appropriate response template corresponding to the megacategory.

7. The computer program product of claim 6 wherein each attribute is associated with a set of patterns and each pattern within the set of patterns is semantically equivalent.

8. The computer program product of claim 7, further comprising instructions causing a machine to:

determine which attributes have patterns that match portions of the present input to the dialogue with each attribute having a variable used to record whether a match exists.

9. The computer program product of claim 8, further comprising instructions causing a machine to:

mark a variable of attributes true, for those attributes having matched patterns.

10. The computer program product of claim 8, further comprising:

storing a list of matched attributes for each user input.

11. An apparatus comprising:

a memory that stores executable instructions forming a context in a dialogue with a computer; and a processor that executes the instructions to:
form megacategories, with megacategories being combinations of attributes linking to one response template of a plurality of response templates with each of the plurality of the formed megacategories linked by associated attributes to a corresponding one of the plurality of response templates;
select from the formed megacategories a suitable megacategory for a present input involved with a dialog with the apparatus by comparing attributes having true variables from a previous input to attributes having true variables in the present input; and
select an appropriate response template corresponding to the megacategory.

12. The apparatus of claim 11 wherein each attribute is associated with a set of patterns and each pattern within the set of patterns is semantically equivalent.

13. The apparatus of claim 12, further comprising instructions to:
determine which attributes have patterns that match portions of a user's present input to the dialogue with each attribute having a variable used to record whether a match exists.

14. The apparatus of claim 13, further comprising instructions to:
mark a variable of attributes true, for those attributes having matched patterns.

15. The apparatus of claim 13, further comprising instructions to:
store a list of matched attributes for each user input.

* * * * *